Dec. 13, 1966 W. E. WOEHL 3,290,986
TARGET SIMULATING AND AUTO-COLLIMATING OPTICAL INSTRUMENT
Filed Sept. 28, 1962
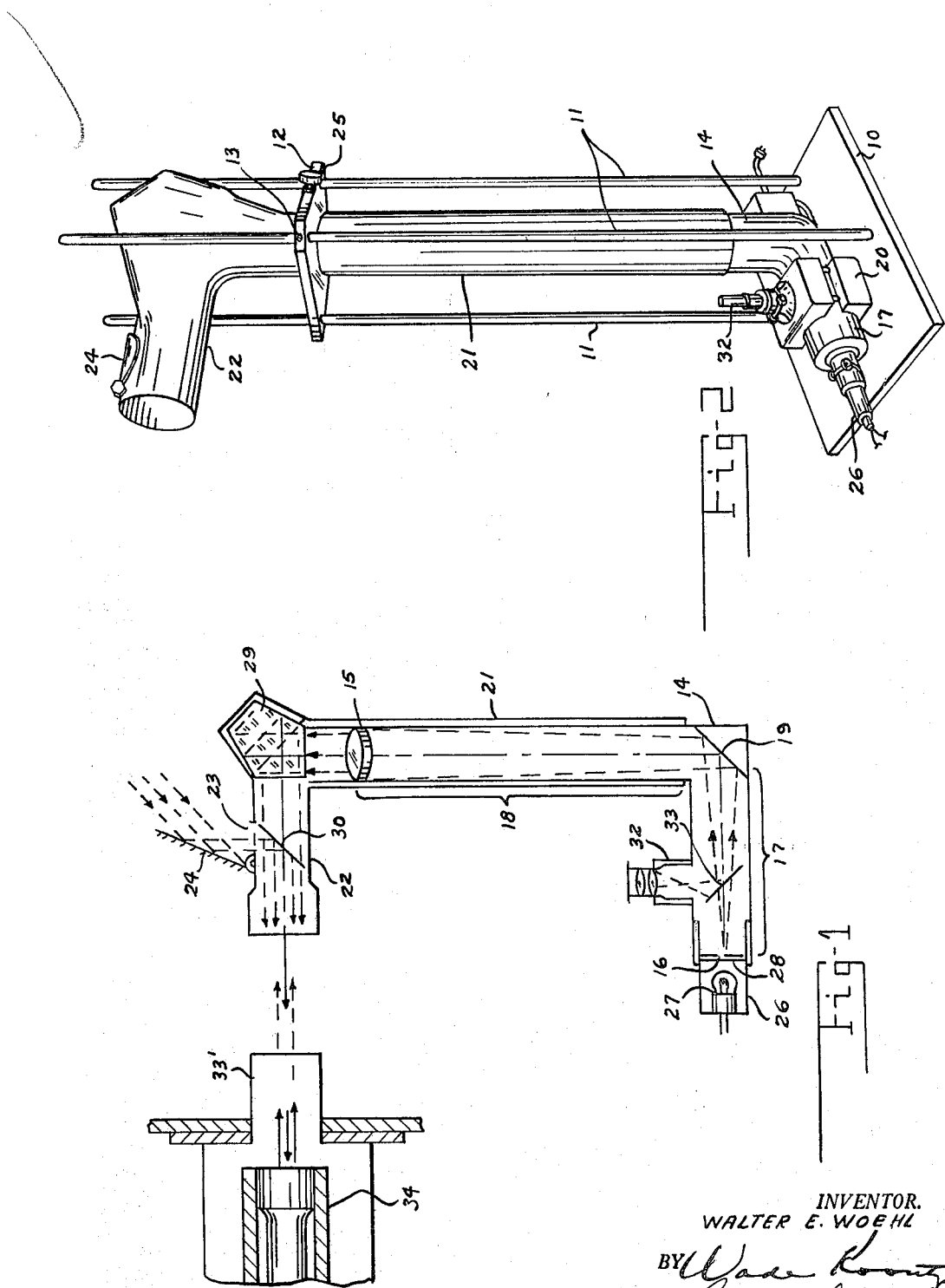
INVENTOR.
WALTER E. WOEHL
BY
ATTORNEYS 3,290,986
TARGET SIMULATING AND AUTO-COLLIMATING OPTICAL INSTRUMENT
Walter E. Woehl, Alamogordo, N. Mex., assignor to the United States of America as represented by the Secretary of the Air Force
Filed Sept. 28, 1962, Ser. No. 227,681
2 Claims. (Cl. 88—14)

The invention described herein may be manufactured and used by or for the United States Government for governmental purposes without payment to me of any royalty thereon.

This invention relates to a target simulator and calibrator for a combined optical and photoelectric sensory system.

Space sensor systems combining telescopic optical imaging an electronic image intensification are presently being employed. In such instances, image orthicon picture tubes are substituted for the photographic plates of the conventional photo-optical systems. The image orthicon converts the telescopic optical image into an electrical charge image and, subsequently, into time sequential electrical pulses. To accomplish the electronic imaging with efficiency, and to obtain maximum intensification, certain critical electrical potentials and currents must be set at an optimum value. Since the desired optimum values are dependent upon the relationship of background light level and intensity of target image, the proper settings of optimum value may be found by viewing the actual conditions of background light and target intensity. However, it is necessary that the system be adjusted to optimum values prior to viewing the actual conditions during the scheduled mission.

Thus, it is an object of this invention to provide for preoperational adjustment of sensor control settings at optimum values.

It is an object of this invention to provide a target simulator producing an artificial star superimposed upon natural sky background radiation.

Another object of this invention is to provide a target simulating instrument capable of being adapted as an auto collimator to align an image orthicon tube with its respective telescope axis.

Other objects and a fuller understanding may be had to the following description and claims, taken in conjunction with the accompanying drawings, in which:

FIG. 1 is a schematic cross section of a collimated target simulator.

FIG. 2 is a perspective of the invented apparatus mounted for operation.

With reference to FIG. 2, a horizontally inclined base 10 has support rods 11 suitably secured thereto in an upright position. Support plate 12 is affixed on support rods 11 at a desired level by a suitable means, such as the lock screw 13 illustrated.

A collimator may be defined as an optical apparatus producing parallel rays of light, and commonly consists of a converging lens, focused on a small source of light, usually a pinhole aperture. Light beams diverging from the aperture emerge from the object lens in a parallel beam and, thus, are viewed through the collimator without parallax, with the aperture at an infinite distance.

As illustrated, a collimator herein is provided by tube 14 containing objective lens 15 with its principal focus at target aperture 16. Tube 14 is of an L-shape formed by joining an aperture portion, indicated at 17, and a lens portion, indicated at 18. Reflector 19, a mirror or prism, is mounted at the juncture of tube portions 17 and 18 for the purpose of directing light from the aperture 16 out through the collimator lens 15. As illustrated in FIG. 2, mounting blocks 20 secure aperture portion 17 of tube 14 to the base 10 with the lens portion 18 disposed in a vertical position.

Sleeve 21 fits over the vertical lens portion 18 with an orthogonally related extension 22 extending therefrom as shown. A light admitting opening in extension 22 provides a skylight at 23. Reflector 24 is mounted on extension 22 above the skylight 23 to direct natural sky radiation into extension 22. As shown in FIG. 2, reflector 24 may be utilized to provide an enclosing cover for window 23, if so desired. Sleeve 21 is clamped within an opening in support plate 12 at a desired level by clamp screw 25.

The variable light source, indicated generally at 26, is provided at the target aperture 16 by electric lamp 27 connected to an electrical source through a standard current regulator (not shown). Fine variations of light may be effectuated by placing an interchangeable neutral density filter 28 between lamp 27 and aperture 16.

A reflecting means to continue light from lens 15 through extension 22, is provided by penta-reflector 29, a prism or mirror arrangement, mounted within the sleeve 21 at the juncture of extension 22, so that light emerging from the collimator will be continued, without inversion, through the extension 22, as shown.

Beam splitter 30, which may be a semisilvered, semitransparent mirror or a beam splitter prism of the usual type, is mounted beneath the skylight 23, at a position between the skylight and collimator. The beam splitter 30 functions to allow the passage of light from the collimator while simultaneously reflecting light from the skylight 23 in the same direction through the extension 22. In this manner, parallel light beams from aperture 16 are mixed with natural sky beams and thus give the appearance of a natural star at an infinite distance upon a natural sky background. Any suitable mounting method may be employed which allows the beam splitter to function properly and at the same time afford quick removal of the beam splitter.

A viewer, indicated generally at 32, is provided in the aperture portion 17 near aperture 16. The viewer 32 of the preferred embodiment, shown, includes eyepiece lenses and associated reticle for beam displacement measurements. A beam splitter 33 is securely positioned between the aperture 16 and the viewer 32 in a manner allowing light beams from aperture 16 to freely pass out through the collimator, while reflecting returning beams upward to the viewer 32. Thus, the instrument is available for standard auto-collimation work by simply removing the beam splitter 30 and measuring displacement of a reflected target aperture in viewer 32.

Operation is described in conjunction with an advanced space sensor system represented in FIG. 1 by an optical telescope 33' and image orthicon tube 34. The target simulating instrument is set in front of the telescope 34 and brought into position by adjusting screw clamp 25 of support plate 12. Reflector 24 is adjusted to direct sky beams through the skylight 23 and intensity of the target aperture is adjusted by varying the lamp voltage and, if necessary, by inserting neutral density filters 28 for further dimming. Natural sky radiation admitted through skylight 23 is reflected off beam splitter 30 and mixed with the parallel light beams of the collimator. The resulting target star upon a natural sky background is optically focused by telescope 33' on orthicon 34. The orthicon controls (not shown) may then be adjusted to give the sharpest and clearest image on a cathode ray tube monitor screen (not shown).

The instrument may be used as an auto-collimator for the purpose of aligning the image orthicon 34 with the axis of the telescope 33'. This is accomplished by aligning the instrument and telescope axes with beam splitter 30 removed and then removing the telescope 33'.

Parallel beams of light are reflected off the face of the orthicon tube 34 and back into the instrument to yield a reflected image of the target star in viewer 32. Displacement of the return image indicates misalignment of the orthicon 34. This displacement is measured and a standard auto-collimator correction may be applied to the orthicon position.

Although a single embodiment of the present invention has been illustrated and described, it will be apparent to those skilled in the art that various changes and modifications may be made therein without departing from the spirit of the invention or from the scope of the appended claims.

I claim:

1. A target simulating and auto-collimating instrument comprising: a collimator defined by an L-shaped tube having an aperture portion containing a focal target aperture and a lens portion containing an objective lens, a reflector positioned at the junction of said portions of said L-shaped tube, a viewer in said aperture portion positioned proximate to said focal target aperture, said viewer comprising an eyepiece lens and associated reticle with an optical axis at an angle to the longitudinal axis of said aperture portion, a sleeve fitting over said lens portion and having an orthogonally related extension with a skylight therein, a variable light source provided at said focal target aperture, a reflector mounted on said extension to direct sky beams through said skylight, a penta-reflector positioned in said sleeve between said collimator and extension to continue light therethrough; a beam splitter secured in said collimator between said focal target aperture and viewer to afford auto-collimating adaption; and a removable beam splitter mounted in said extension between said collimator and skylight to simultaneously pass and reflect light from said collimator and skylight respectively through said extension thereby presenting a simulated target star on a sky background.

2. A target simulating and auto-collimating instrument comprising: a horizontal base, a vertically disposed support sustained by said base, a collimator defined by an L-shaped tube having an aperture portion containing a focal target aperture and a lens portion containing an objective lens, a reflector positioned at the junction of said portions of said L-shaped tube, said aperture portion secured on said base to vertically dispose said lens portion, a viewer in said aperture portion positioned proximate to said focal target aperture, said viewer comprising an eyepiece lens and associated reticle with an optical axis at an angle to the longitudinal axis of said aperture portion, a sleeve fitting over said lens portion and having an orthogonally related extension with a skylight therein, said sleeve clamped on said support at a desired position, a variable light source provided at said focal target aperture, a reflector mounted on said extension to direct sky beams through said skylight, a penta-reflector positioned in said sleeve between said collimator and extension to continue light therethrough; a beam splitter secured in said collimator between said focal target aperture and viewer to afford auto-collimating adaption; and a removable beam splitter mounted in said extension between said collimator and skylight to simultaneously pass and reflect light from said collimator and skylight respectively through said extension thereby presenting a simulated target on a sky background.

References Cited by the Examiner

UNITED STATES PATENTS

| 2,377,797 | 6/1945 | Macgill | 88—1 X |
| 2,384,666 | 9/1945 | Wood. | |
| 2,407,467 | 9/1946 | Barry | 88—2.3 |
| 2,510,374 | 6/1950 | Brady. | |

FOREIGN PATENTS

| 370,626 | 1/1907 | France. |

DAVID H. RUBIN, *Primary Examiner.*